US007477431B2

United States Patent
Kinumura

(10) Patent No.: US 7,477,431 B2
(45) Date of Patent: Jan. 13, 2009

(54) IMAGE READING APPARATUS UTILIZING THREE COLOR CHANNEL CIRCUITRY TO CAPTURE FOUR COLOR CHANNELS OF IMAGE DATA

(75) Inventor: Kengo Kinumura, Kawasaki (JP)

(73) Assignee: Canon Kabushiki Kaisha (JP)

(*) Notice: Subject to any disclaimer, the term of this patent is extended or adjusted under 35 U.S.C. 154(b) by 650 days.

(21) Appl. No.: 11/191,811

(22) Filed: Jul. 28, 2005

(65) Prior Publication Data

US 2006/0023268 A1 Feb. 2, 2006

(30) Foreign Application Priority Data

Jul. 29, 2004 (JP) ............... 2004-221818

(51) Int. Cl.
*H04N 1/46* (2006.01)
(52) U.S. Cl. .............. 358/514; 358/501; 358/505; 358/512; 358/513; 358/515
(58) Field of Classification Search .............. 358/501, 358/505, 512–515, 445, 474; 356/222
See application file for complete search history.

(56) References Cited

U.S. PATENT DOCUMENTS

| | | | |
|---|---|---|---|
| 4,891,690 A * | 1/1990 | Hasegawa et al. ........... 358/514 |
| 5,003,380 A * | 3/1991 | Hirota ........................ 358/500 |
| 5,689,347 A * | 11/1997 | Naoi ........................... 358/444 |
| 6,459,512 B1 | 10/2002 | Kawahara et al. | |
| 2004/0008386 A1* | 1/2004 | Shiraishi ..................... 358/474 |
| 2004/0165234 A1* | 8/2004 | Hashizume ................. 358/505 |

FOREIGN PATENT DOCUMENTS

JP 2003-087583 A 3/2003

* cited by examiner

*Primary Examiner*—Mark K Zimmerman
*Assistant Examiner*—Javier J Ramos
(74) *Attorney, Agent, or Firm*—Rossi, Kimms & McDowell, LLP

(57) ABSTRACT

It is made possible to effect the reading of image data of four channels (corresponding to four basic colors) without resulting in an increase in the construction of an A/D conversion circuit for three channels (corresponding to three basic colors). In an image reading apparatus provided with photoelectric conversion element arrays 401a-401d capable of resolving an inputted optical signal into four basic colors and outputting them as analog electrical signals, and an A/D conversion circuit 407 capable of inputting three analog electrical signals at a time, three or less analog electrical signals are selected from the photoelectric conversion element arrays 401a-401d at the image reading of one main scanning line and also, a different combination of analog electrical signals are selected at the image reading of two adjacent main scanning lines, and the selected analog electrical signals are outputted to the A/D conversion circuit 407.

4 Claims, 11 Drawing Sheets

IMAGE READING APPARATUS UTILIZING THREE COLOR CHANNEL CIRCUITRY TO CAPTURE FOUR COLOR CHANNELS OF IMAGE DATA

BACKGROUND OF THE INVENTION

1. Field of the Invention

This invention relates to an image reading apparatus, an image reading method and a program, and particularly to an image reading apparatus which photoelectrically converts an inputted original image, and converts an analog electrical signal obtained by the photoelectric conversion into a digital signal, an image reading method applied to the image reading apparatus, and a program for causing a computer to execute the image reading method.

2. Related Background Art

Heretofore, in a color image reading apparatus for reading an original image as a multi-color image, an optical signal representative of the image has usually been converted into an electrical signal by a CCD sensor. This CCD sensor is generally comprised of three line sensors, films which provide red (R), green (G) and blue (B) color filters are applied to the surfaces of the respective line sensors, and electrical signals corresponding to the respective colors are outputted by these line sensors.

The color reproducibility of the image read by the color image reading apparatus is determined by the spectral characteristic of a light source and a spectral transmission characteristics of the color filters. The kinds of the color filters include ones using complementary colors, i.e., cyan (C), magenta (M) and yellow (Y), corresponding to an output apparatus such as a printing machine, besides R, G and B, and one corresponding to an XYZ color system using measured color values X, Y and Z which do not depend on a device, and all of these are provided with a view to improve the color reproducibility of the color image reading apparatus.

Generally, a color filter used in the XYZ color system adopts a construction in which many kinds of color filters are combined together, from the feature of the spectral characteristic thereof, and therefore an image processing system becomes complicated.

As technique which can more improve color reproducibility than the RGB three-color system, there are, for example, a method of effecting image reading by four colors, i.e., R, G, B and Ye (yellow), as shown in Japanese Patent Application Laid-Open No. 2003-87583, and a method of effecting image reading by multiple colors through the colors are not specified, as shown in U.S. Pat. No. 6,459,512. The color reproducibility basically has the possibility of being more improved as the number of basic colors expressing an image is increased, and therefore these methods can be said to be effective for improving the color reproducibility. However, a great number of channels lead to the corresponding complication of a subsequent image processing system.

The conversion of an analog signal into a digital signal is effected in order to thereafter carry out shading correction, matrix conversion, gamma correction and various kinds image processing to analog image data read by four channels (four basic colors) on a digital circuit IC (integrated circuit) in the color image reading apparatus or a PC (personal computer).

The final image data, although depending on an output device which becomes a target, is usually converted into RGB three-color system.

An IC chip used in ordinary analog-to-digital conversion (A/D conversion) is of a type which effects the A/D conversion of data of three channels corresponding to three colors, i.e., R, G and B, and when an attempt is made to effect the A/D conversion of data of four channels by the use of this IC chip, two IC chips for three channels become necessary. Also, recently, many application specific integrated circuits (ASIC) containing an A/D-converting function therein have arrived on the market, and it is conceivable to effect the A/D conversion of the data of four channels by the use of these, but in such case, it is necessary to provide an IC chip for A/D conversion outside.

SUMMARY OF THE INVENTION

It is the object of the present invention to provide an image reading apparatus for effecting line reading in a main scanning direction by scanning in a sub-scanning direction to thereby read the image of an original, including:

a photoelectric conversion device capable of resolving an optical signal representative of an inputted line image into a number of basic colors exceeding a predetermined number and outputting them as analog electrical signals;

an analog/digital conversion circuit capable of inputting the predetermined number of analog electrical signals differing from one another at a time, and converting the respective analog electrical signals into digital signals; and a selection circuit for selecting the analog electrical signals equal to or less than the predetermined number from the output of the photoelectric conversion device at each image reading of one main scanning line and also selecting the analog electrical signals of a different combination at the image reading of both adjacent main scanning lines, and outputting them to the analog/digital conversion circuit.

DESCRIPTION OF THE PREFERRED EMBODIMENTS

The best embodiments for carrying out the present invention will hereinafter be described with reference to the drawings.

First Embodiment

Figure 1:
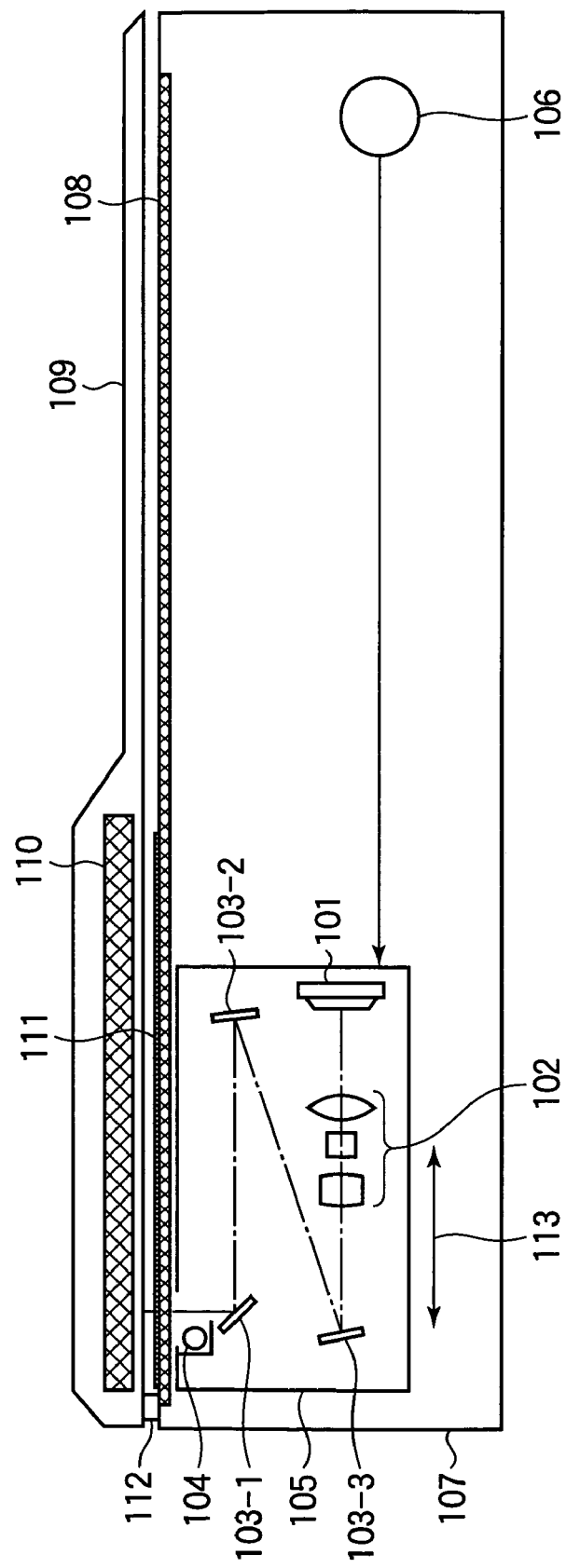
FIG. 1 is a cross-sectional view schematically showing the construction of an image reading apparatus according to an embodiment of the present invention.

FIG. 1 is a cross-sectional view schematically showing the construction of an image reading apparatus according to a first embodiment of the present invention.

Referring to FIG. 1, an original supporting table glass 108 for installing an original thereon is disposed in the upper portion of an image reading apparatus main body 107, and an optical system unit 105 is disposed in the interior of the image reading main body 107. In the interior of the optical system unit 105, there are mounted a photoelectric conversion device 101 for converting an optical signal into an electrical signal, a lens unit 102 for converging reflected light from a reflecting original or transmitted light from a transmitting original, mirrors 103-1 to 103-3 for turning back the reflected light or the transmitted light, and a white light source 104 for illuminating the reflecting original. In the case of the reflecting original, the reflected light from the original irradiated by the light source 104 arrives at the photoelectric conversion device 101 via the mirrors 103-1 to 103-3 and the lens unit 102 and also, the optical system unit 105 is moved in the direction of arrow 113 (sub-scanning direction) by a motor 106, whereby the reading of the original is effected. That is, each portion of the optical system unit 105 is designed to extend in the depth direction of FIG. 1, and this depth direction becomes a main scanning direction, and the reading of the image of the original is effected in connection with the sub-scanning direction.

On the other hand, in the case of the transmitting original, the white light source 104 for the reflecting original is turned off, and a light source 110 for the transmitting original mounted in a transmitting original irradiating apparatus main body 109 is turned on, and light transmitted through the transmitting original 111 arrives at the photoelectric conversion device 101 via the mirrors 103-1 to 103-3 and the lens unit 102 and also, the optical system unit 105 is moved in the direction of arrow 113 by the motor 106, whereby the reading of the image of the original is effected. The reference numerals 112 designates a hinge for installing the transmitting original irradiating apparatus main body 109 on the image reading apparatus main body 107.

Figure 2:
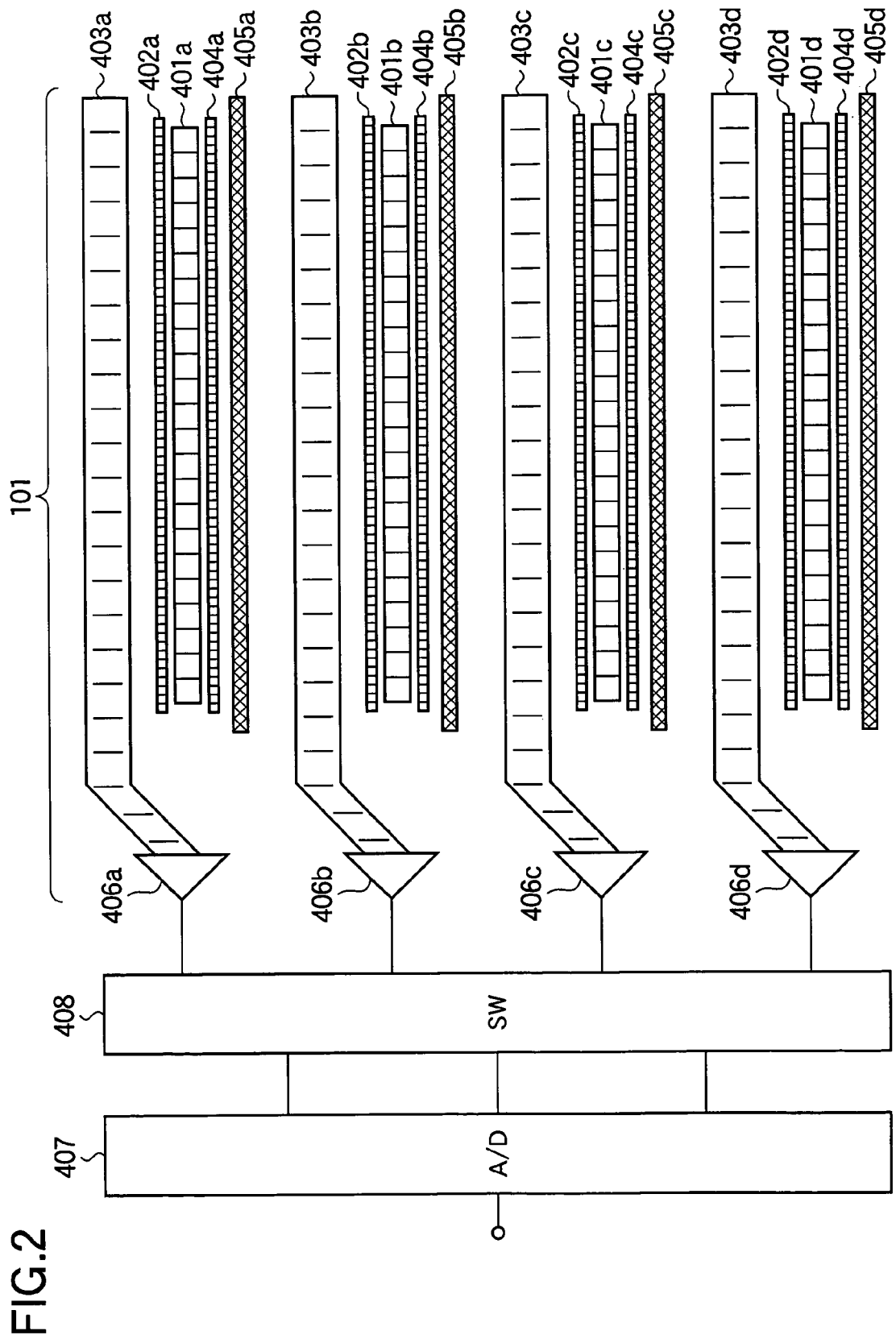
FIG. 2 shows the detailed construction of a photoelectric conversion device in a first embodiment, and a switch (SW) and an A/D conversion circuit to which an output signal from the photoelectric conversion device is inputted.

FIG. 2 shows the detailed construction of the photoelectric conversion device 101 in the first embodiment, and a switch (SW) 408 and an A/D conversion circuit 407 to which an output signal from the photoelectric conversion device 101 is inputted.

In the photoelectric conversion device 101 in the first embodiment, the element arrays 401$a$-401$d$ of a photoelectric conversion element for converting optical signals corresponding to four colors (i.e., herein, red, green, blue and emerald) into charges for each pixel are provided in proximity to one another, and the charges for each pixel produced here are transferred to transfer paths 403$a$-403$d$ through transfer gates 402$a$-402$d$ at predetermined timing. This predetermined timing is controlled by the transfer gates 402$a$-402$d$.

On the other hand, in the case of image data which need not be read, the charges from the photoelectric conversion element arrays 401$a$-401$d$ are discharged to overflow drains (OFD) 405$a$-405$d$ located on the side opposite to the transfer paths 403$a$-403$d$ about the photoelectric conversion element arrays 401$a$-401$d$. The discharging of the charges to these overflow drains 405$a$-405$d$ is effected by electronic shutter gates 404$a$-404$d$.

The charges transferred to the transfer paths 403$a$-403$d$ are transferred on the respective transfer paths 403$a$-403$d$ and to respective amplifying portions 406$a$-406$d$ at a time in the four rows, and are converted into voltage signals and are amplified to an appropriate level by the amplifying portions 406$a$-406$d$.

The switch (SW) 408 and the A/D conversion circuit 407 are connected to the output end of the photoelectric conversion device 101 of the construction as described above. The A/D conversion circuit 407 is an A/D conversion circuit of a popular type for three-channel input, and converts an analog electrical signal of three channels into a digital signal. The switch (SW) 408 is connected to the amplifying portions 406$a$-406$d$ of the photoelectric conversion device 101, and selects an analog electrical signal of three channels at most to be sent to the input terminal of the A/D conversion circuit 407 from among analog electrical signals of four channels sent from the amplifying portions 406$a$-406$d$.

Operation control for the transfer gates 402$a$-402$d$ and the electronic shutter gates 404$a$-404$d$, and the switch (SW) 408 and the A/D conversion circuit 407 is effected by a controlling apparatus, not shown. This controlling apparatus is comprised, for example, of a central processing unit (CPU), a ROM (read only memory) storing therein a program executed by the CPU, a RAM (random access memory), the CPU uses for calculation, an input-output device, etc.

Figure 3:
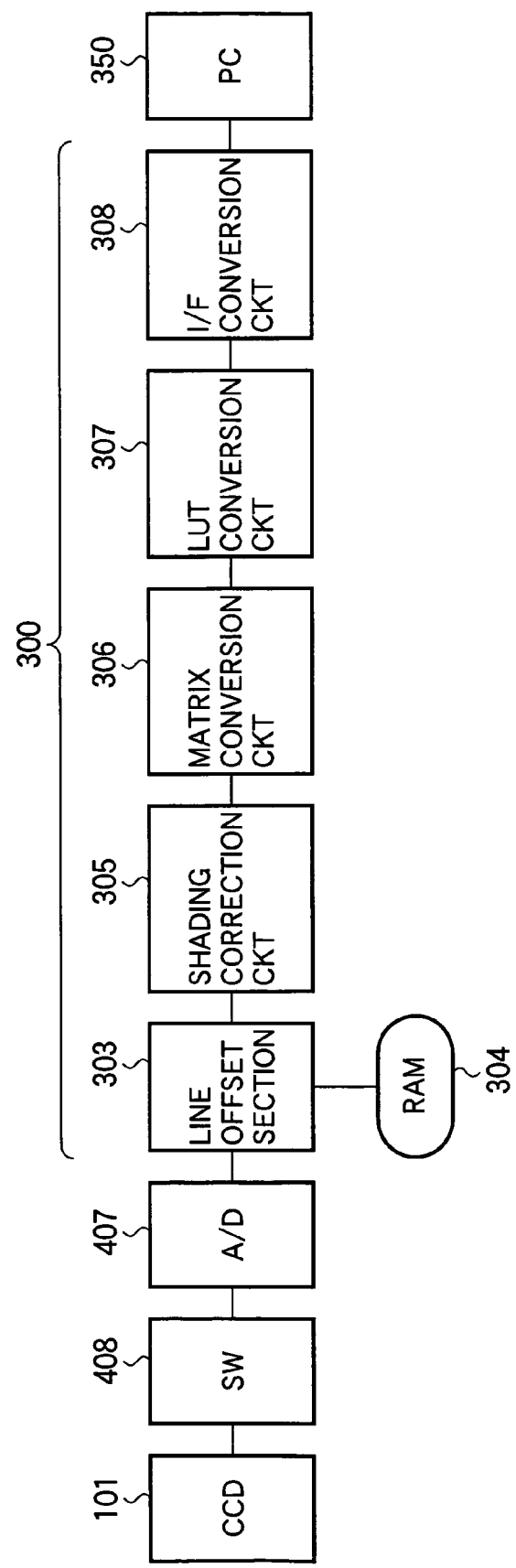
FIG. 3 is a block diagram showing the construction of an image processing portion included in an image reading apparatus main body shown in FIG. 1, which carries out image processing to an image signal outputted from the A/D conversion circuit.

FIG. 3 is a block diagram showing the construction of an image processing portion 300 included in the image reading apparatus main body 107 shown in FIG. 1 which carries out image processing to an image signal outputted from the A/D conversion circuit 407.

Image data read by the photoelectric conversion device (CCD) 101 is converted from the form of an analog signal into the form of a digital signal in the A/D conversion circuit 407 through the switch (SW) 408. The signals to be inputted to the A/D conversion circuit 407 are discretely inputted for each channel, and in the A/D conversion circuit 407, signals from corresponding photoelectric elements of a plurality of channels are converted into a signal arrangement of successive pixels in one set.

The photoelectric conversion element arrays 401a-401d of four channels in the photoelectric conversion device (CCD) 101 shown in FIG. 2 are parallel to one another and are arranged in the sub-scanning direction, and the physical interval between adjacent ones of these rows correspond to a length tens of times as great as the size of a pixel. Therefore, it is necessary to correct the physical difference in the reading position in the photoelectric conversion element arrays 401a-401d. That is, a line offset section 303 temporarily stores the image data obtained from the photoelectric conversion element arrays 401a-401d of four channels in the RAM 304, whereafter image data of four channels read from one and the same location on the original is read out from the RAM with the timing shifted, and the correction of this difference is effected.

In a shading correction circuit 305, shading correction which increases the uniformity of a dark portion side and a light portion side is effected on the image data outputted from the line offset section 303. Then, correction of image color is effected in a matrix conversion circuit 306, luminance correction for adjusting the luminance to a monitor or the like is effected in an LUT (Look-up Table) conversion circuit 307. Further, the conversion of the signal form into a designated interface type is effected in an interface (I/F) conversion circuit 308, and the transfer of the image data to an external personal computer (PC) is effected.

Description will now be made of a method of causing an image signal of four channels obtainable by the photoelectric conversion device (CCD) 101 to be A/D-converted in the A/D conversion circuit 407 only having the capability of processing three channels.

Figure 4:
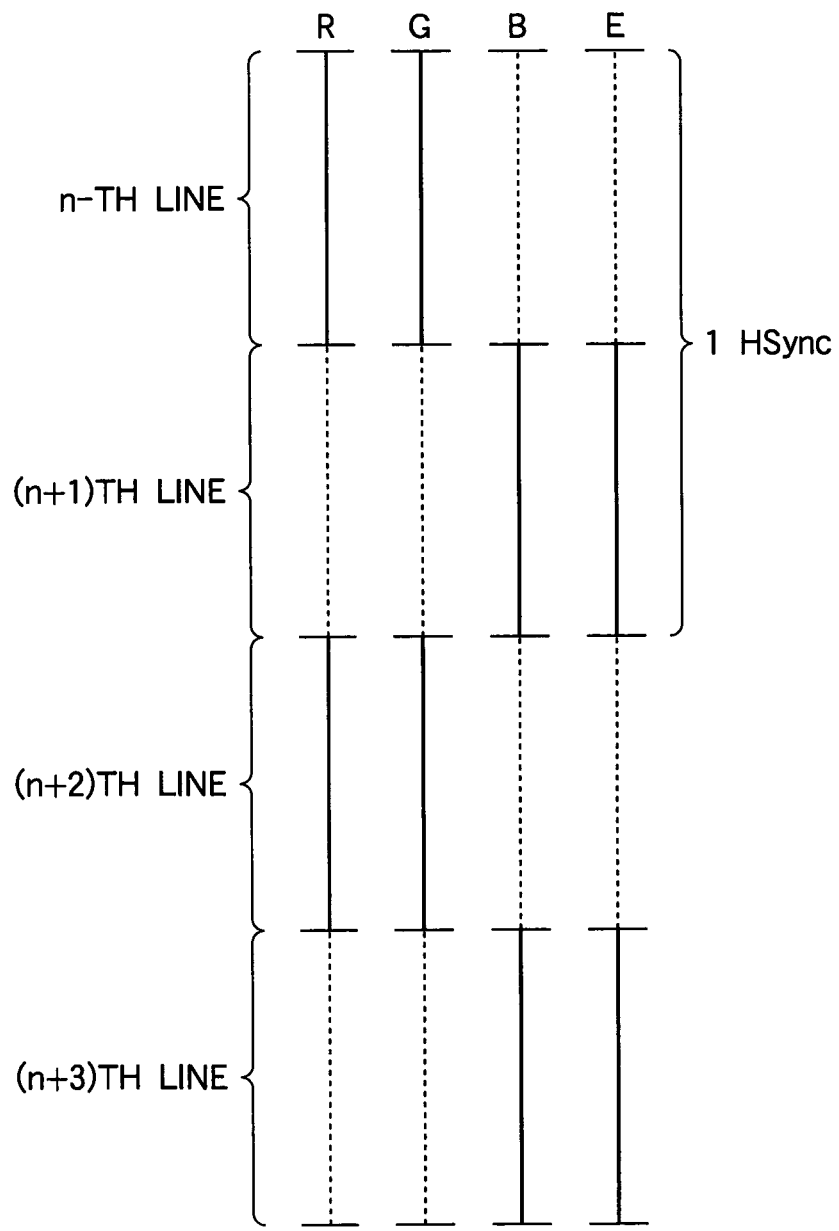
FIG. 4 shows the state of the reading of the image signal effected by four main scanning lines in a case where from image data of four channels obtainable by a photoelectric conversion element, data of two channels is read twice at a time and is sent to the A/D conversion circuit.

FIG. 4 shows the state of the transfer of the image signal effected on four main scanning lines (nth to (n+3)th) in a case where from image data of four channels (R, G, B and E) obtainable by the photoelectric conversion device (CCD) 101, data of two channels is transferred to the A/D conversion circuit 407 twice at a time.

In FIG. 4, four channels (space axes) are shown in a lateral direction, and four main scanning line reading periods (time axes) are shown in a longitudinal direction, and solid lines mean portions to which the image signal is transferred, and dotted lines means portions to which the image signal is not transferred.

For example, in the nth main scanning line reading period, images of two R and G channels are transferred and images of B and E channels are not transferred. That is, the electronic shutter gates in the photoelectric conversion device (CCD) 101 corresponding to the B and E channels are opened and charges are discharged from the corresponding photoelectric conversion element arrays to the corresponding overflow drains, while on the other hand, the transfer gates in the photoelectric conversion device (CCD) 101 corresponding to the R and G channels are closed and charges are accumulated in the corresponding photoelectric conversion elements. Then, after the lapse of a predetermined accumulation time, the transfer gates corresponding to the R and G channels are opened and charges are transferred to the corresponding transfer paths, and the switch (SW) 408 selects the image signals of the R and G channels so as to transfer them to the A/D conversion circuit 407.

Next, in the (n+1)th main scanning line reading period, the images of two B and E channels are transferred and the images of the R and G channels are not transferred. The reading of the above-mentioned two main scanning lines is effected while the optical system unit 105 is moved in the sub-scanning direction. Thus, as regards the two main scanning lines, adjacent lines are read. By the images on the two adjacent main scanning lines being thus read, the reading of a plurality of colors is effected, and this is regarded as the reading of a color image of one main scanning line. The thus regarded reading of the color image of one main scanning line is effected in accordance with a horizontal synchronizing signal and is written as "1HSync" in the drawing.

When this is repeated, a signal of two channels is always inputted to the A/D conversion circuit 407, and to the A/D conversion circuit 407 for three channels, the scope of its processing capability is not exceeded.

Figure 5:
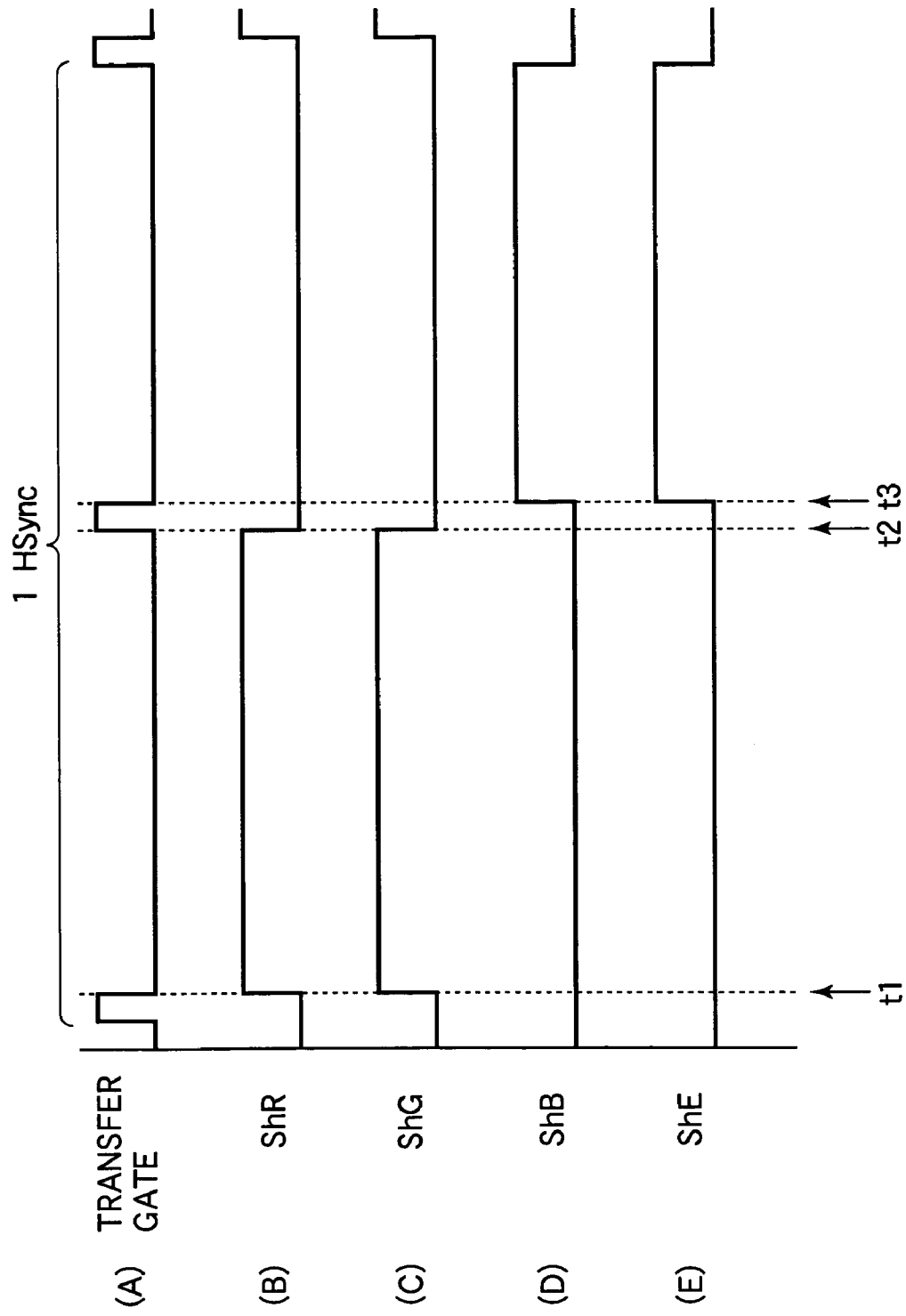
FIG. 5 is a timing chart showing the operations of a transfer gate and an electronic shutter gate in the photoelectric conversion device.

FIG. 5 is a timing chart showing the operations of the transfer gates 402a-402d and electronic shutter gates 404a-404d in the photoelectric conversion device (CCD) 101.

In FIG. 5, (A) indicates a transfer gate signal inputted to the transfer gates 402a-402d, and one and the same transfer gate signal is inputted to the transfer gates 402a-402d, and during high level input, each transfer gate is opened and the charges accumulated in the photoelectric conversion element arrays 401a-401d are transferred to the transfer paths 403a-403d, respectively.

At timing t1 immediately after the transfer of the charges has been effected (a time t1 after the horizontal synchronizing signal), high-level signals (ShR and ShG in (B) and (C) of FIG. 5) are inputted to the electronic shutter gates corresponding to the R and G channels, and these electronic shutter gates are closed so that the charges may not be discharged from the photoelectric conversion elements corresponding to the R and G channels to the corresponding overflow drains. At the same time, low-level signals (ShB and ShE in (D) and (E) of FIG. 5) are inputted to the electronic shutter gates corresponding to the B and E channels, and these electronic shutter gates are opened, and the charges are discharged from the photoelectric conversion elements corresponding to the B and E channels to the corresponding overflow drains and thus, the charges are not accumulated in these.

At timing t2 after a predetermined accumulation time has elapsed from the timing t1, the accumulation of the charges in the photoelectric conversion elements corresponding to the R and G channels is completed. At this time, the transfer gate signal inputted to the transfer gates 402a-402d assumes a high level, and the transfer of the charges from the photoelectric conversion element arrays 401a-401d to the transfer paths 403a-403d is effected. The transfer of the charges to the transfer paths 403a-403d is effected in all of the channels, but in the B and E channels, the charges are not accumulated in the photoelectric conversion elements and therefore, the transfer of the charges does not take place.

At timing t3 whereat the transfer of the charges has been completed (after the pulse width of the transfer gate signal (A) has elapsed from the timing t2), high-level signals (ShB and ShE in (D) and (E) of FIG. 5) are inputted to the electronic shutter gates corresponding to the B and E channels, and these electronic shutter gates are closed so that the charges may not be discharged from the photoelectric conversion elements corresponding to the B and E channels may not be discharged to the corresponding overflow drains. At the same time, low-level signals (ShR and ShG in (B) and (C) of FIG. 5) are inputted to the electronic shutter gates corresponding to the R and G channels, and these electronic shutter gates are opened, and the charges are discharged from the photoelectric conversion elements corresponding to the R and G channels to the corresponding overflow drains, and the charges are not accumulated in these.

What has been described above is a case where from the image data of four channels obtainable by the photoelectric conversion device (CCD) 101, data of two channels is read twice at a time and is sent to the A/D conversion circuit 407, but from the image data of four channels, data of one channel and data of three channels may be alternately read and send to the A/D conversion circuit 407. This will now be described with reference to FIG. 6.

Figure 6:
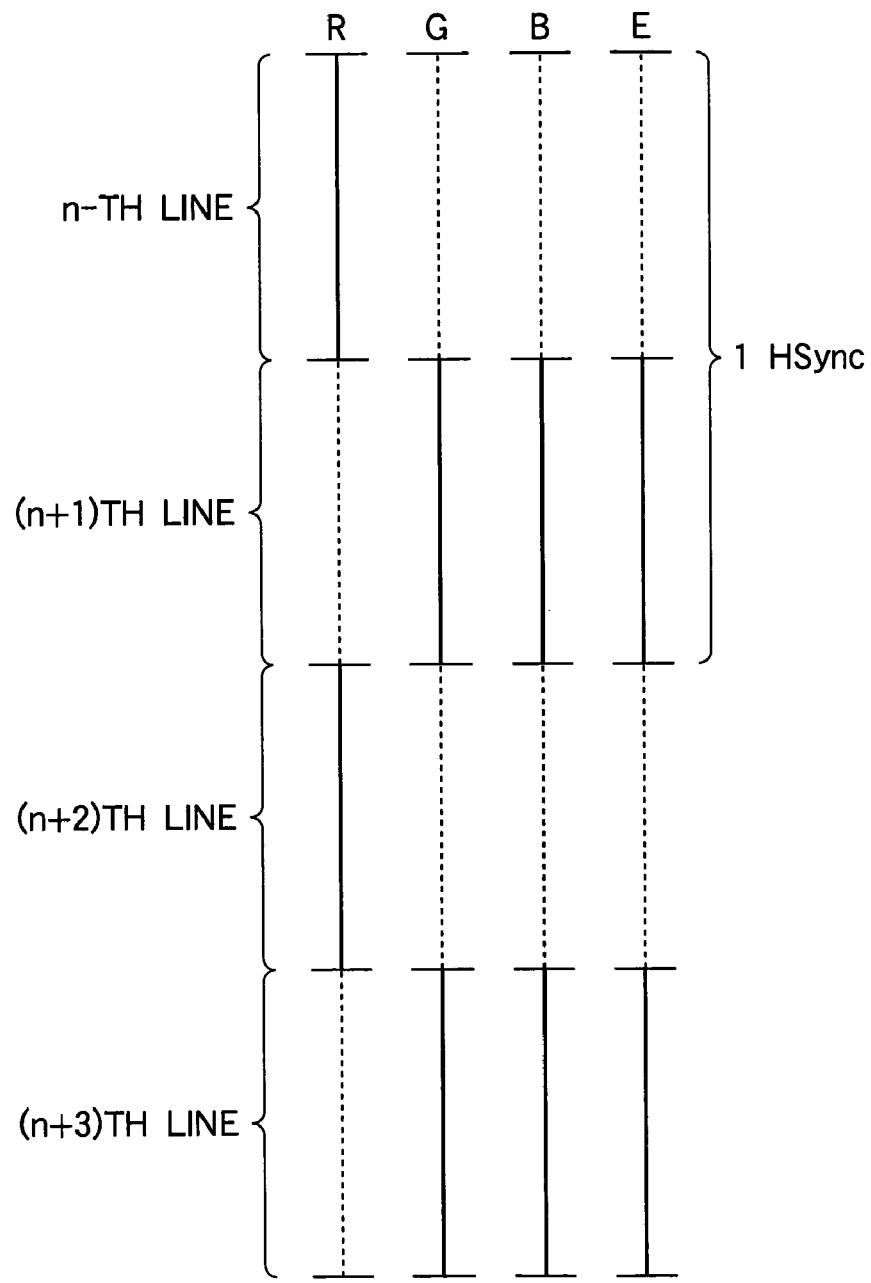
FIG. 6 shows the state of the reading of the image signal effected by the four main scanning lines in a case where from the image data of four channels obtainable by the photoelectric conversion device, data of one channel and data of three channels are alternately read and are sent to the A/D conversion circuit.

FIG. 6 shows the state of the reading of the image signal effected on four main scanning lines (the nth main scanning line to the (n+3)th main scanning line) in a case where from the image data of four channels (R, G, B and E) obtainable by the photoelectric conversion device (CCD) 101, data of one channel and data of three channels are alternately read and sent to the A/D conversion circuit 407.

In a method of alternately transferring an image signal of one channel and an image signal of three channels, for example, in the image reading along the nth main scanning line, the image signal of one R channel is transferred and the image signals of the G, B and E channels are not transferred. Next, in the image reading along the (n+1)th main scanning line, the image signals of the three G, B and E channels are transferred and the image signal of the R channel is not transferred.

As described above, image reading on two adjacent main scanning lines is effected, and this is regarded as the image reading of one main scanning line.

When this is repeated, the signal of one channel and the signal of the three channels are always alternately inputted to the A/D conversion circuit 407, and to the A/D conversion circuit 407 for three channels, the scope of its processing capability is not exceeded.

The opening-closing operation of each gate by the high-level/low-level signals inputted to the transfer gates 402a-402d and electronic shutter gates 404a-404d of the photoelectric conversion device (CCD) 101 shown in FIG. 5 is an example, and the opening-closing operation in an opposite direction is also possible. Also, even in a case where the electronic shutter gates do not exist in the photoelectric conversion device (CCD) 101, similar control can be effected by using such a suitable method as will not use unnecessary data.

Further, the number of channels (the number of basic colors) which can be read by the photoelectric conversion device (CCD) 101 may be greater than four, and if design is made such that in one main scanning line, image signals of maximum three channels are sent to the A/D conversion circuit, to the A/D conversion circuit 407 for three-channel input, the scope of its processing capability will not be exceeded.

Second Embodiment

A second embodiment of the present invention will now be described.

The construction of the second embodiment is basically the same as the construction of the first embodiment and therefore, in the description of the second embodiment, the same portions as those in the construction of the first embodiment are given the same reference characters and the description of the first embodiment is applied, and only the different portions will hereinafter be described.

In the second embodiment, when the reading of a transmitting original (e.g. a film original) is to be effected, the predetermined accumulation time when charges are accumulated in the photoelectric conversion element arrays 401a-401d is changed in conformity with the transmittance of each channel (separate basic color) of the film.

Description will first be made of the necessity of changing the predetermined accumulation time for charge accumulation for each channel.

Describing by taking as an example a case where the reading go of a negative film original is effected by the use of a three-channel photoelectric conversion device (CCD), the negative film generally has the characteristic that the transmittance for the R color on the long wavelength side is high and conversely, the transmittance for the B color on the short wavelength side is low.

Figure 7A:
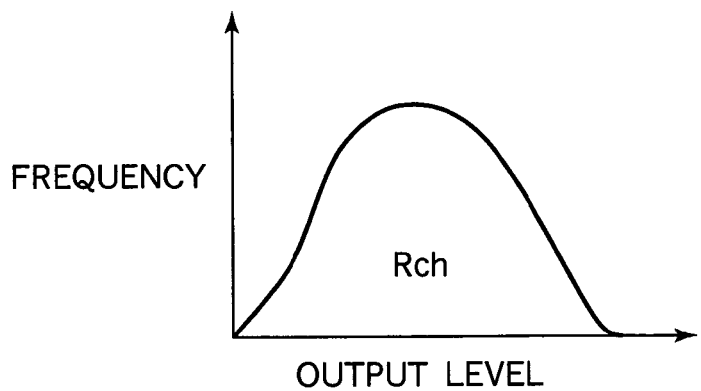
FIGS. 7A, 7B and 7C show the distribution of the frequency of occurrence of the output levels of the image signal outputted from photoelectric conversion element arrays of respective channels when a sample film having photographed a standard white plate has been read in an equal storage time by the use of a photoelectric conversion element array of three channels.
Figure 7B:
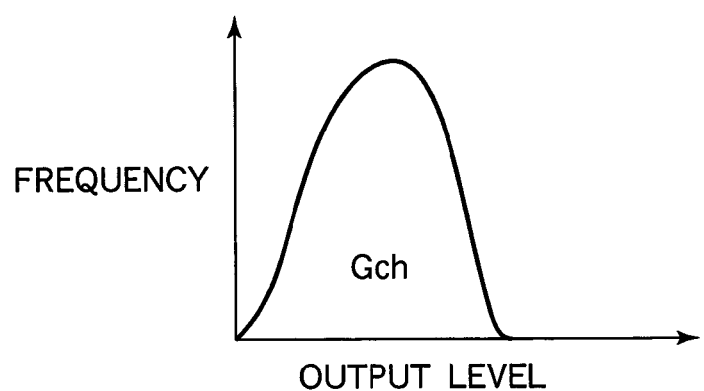
Figure 7C:
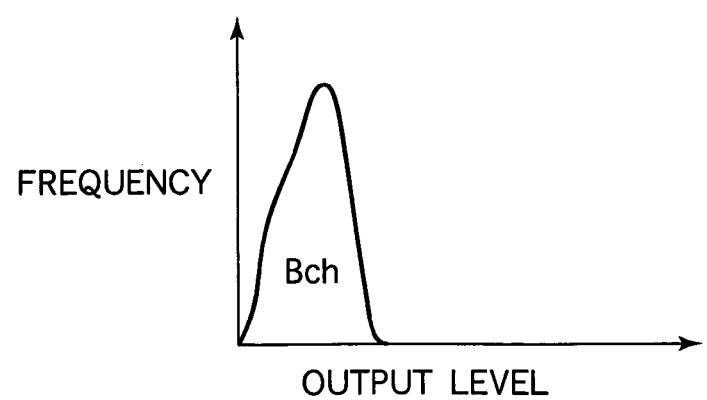

FIGS. 7A to 7C show the distribution of the occurrence frequency of the output level of the image signal outputted from the photoelectric conversion element of each channel when a sample film having photographed a standard white plate has been read in an equal accumulation time by the use of a three-channel photoelectric conversion device (CCD).

As can be seen from this distribution characteristic, the transmittance is nearly R:G:B=4:2:1 and therefore, to correct such inclination of the transmittance characteristic, it is necessary to set the predetermined accumulation time for the charge accumulation in the photoelectric conversion element of each channel to R:G:B=1:2:4. When the predetermined accumulation time in the photoelectric conversion element of each channel is set thus, the electronic shutter gates of the photoelectric conversion element of each channel are opened and closed as shown in FIG. 8.

Figure 8:
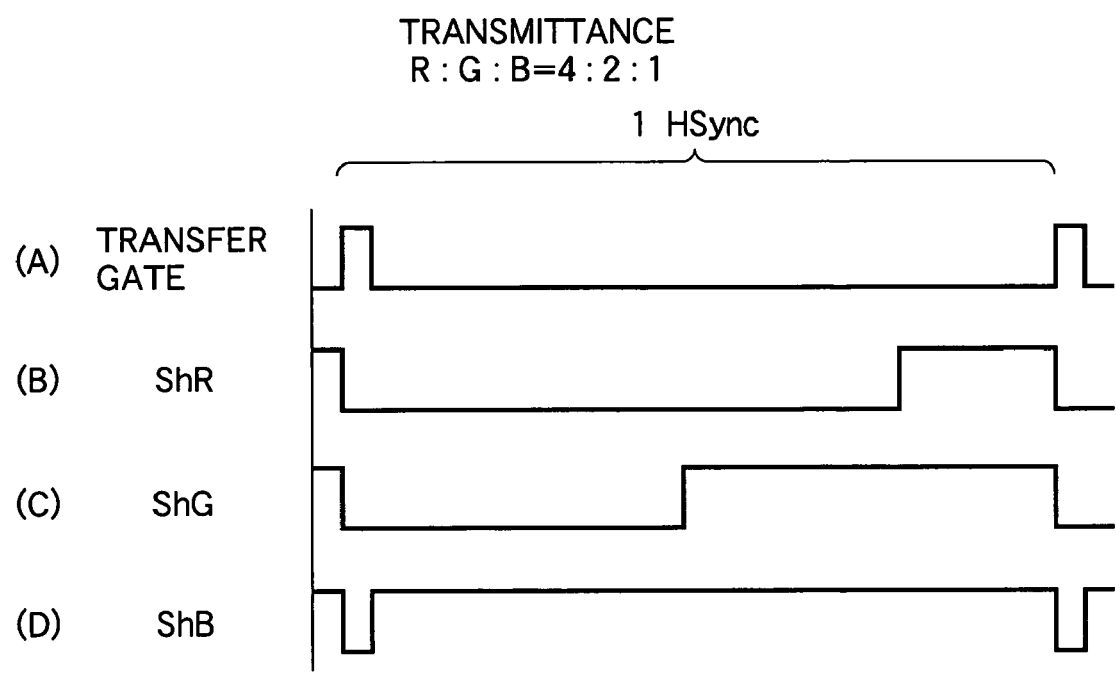
FIG. 8 is a timing chart showing the opening-closing timing of the electronic shutter gates of the photoelectric conversion element array of each channel in a case where a predetermined storage time in the photoelectric conversion element array of three channels is set to R:G:B=1:2:4.

FIG. 8 is a timing chart showing the opening-closing timing of the electronic shutter gates of the photoelectric conversion element of each channel when the predetermined accumulation time in the three-channel photoelectric conversion device is set to R:G:B=1:2:4.

As can be seen from FIG. 8, the time of 1HSync (unit reading time) depends on the B channel ((D) in FIG. 8) which is the longest of the predetermined accumulation times of the respective channels.

Therefore, in a case where as in the first embodiment, by the use of photoelectric conversion elements of four channels and an A/D conversion circuit for three channels, only two channels of the photoelectric conversion elements of four channels (R, G, B and E) are to be read each time, the reading of two main scanning lines becomes 1HSync and therefore, the reading time becomes different depending on which of the four channels (R, G, B and E) are combined together. So, in the second embodiment, the reading time for each channel is set as will be described below.

Figure 9:
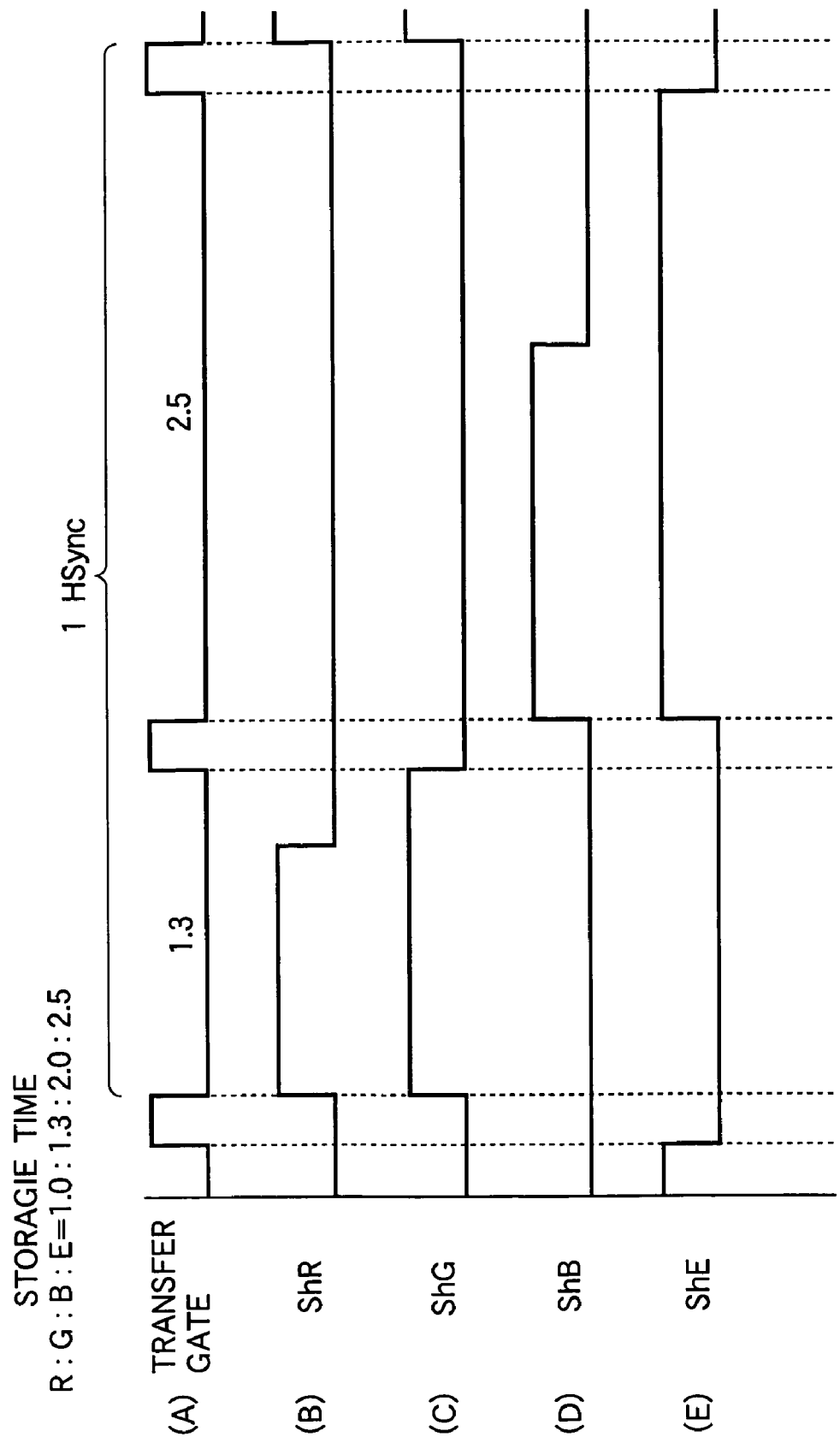
FIG. 9 is a timing chart showing the opening-closing timing of the electronic shutter gates of a photoelectric conversion element array of each channel when only the data of two channels is the object of reading each time in a case where in a second embodiment, a predetermined storage time in a photoelectric conversion element array of four channels is set to R:G:B:E=1.0:1.3:2.0:2.5.

FIG. 9 is a timing chart showing the opening-closing timing of the electronic shutter gates of the photoelectric conversion element of each channel when only two channels are to be read each time in a case where in the second embodiment, the predetermined accumulation time in the photoelectric conversion elements of four channels is set to R:G:B:E=1.0:1.3:2.0:2.5.

When only two channels are to be read each time, in order to make the combination of the reading times shortest, design is made that such that the aforementioned combination is based on the rule that "the channel for which the accumulation time is longest" and "the channel for which the accumulation time is second longest" are combined together, and "the channel for which the accumulation time is third longest" and "the channel for which the accumulation time is shortest" are combined together. That is, if as shown in FIG. 9, image reading is effected in the R and G channels ((B) and (C) in FIG. 9) in the first half (reading time 1.3) and image reading is effected in the B and E channels ((D) and (E) in FIG. 9) in the second half (reading time 2.5), the total reading time is 3.8. This becomes a combination of the channels which makes the total reading time when only two channels are to be read each time shortest.

Figure 10:
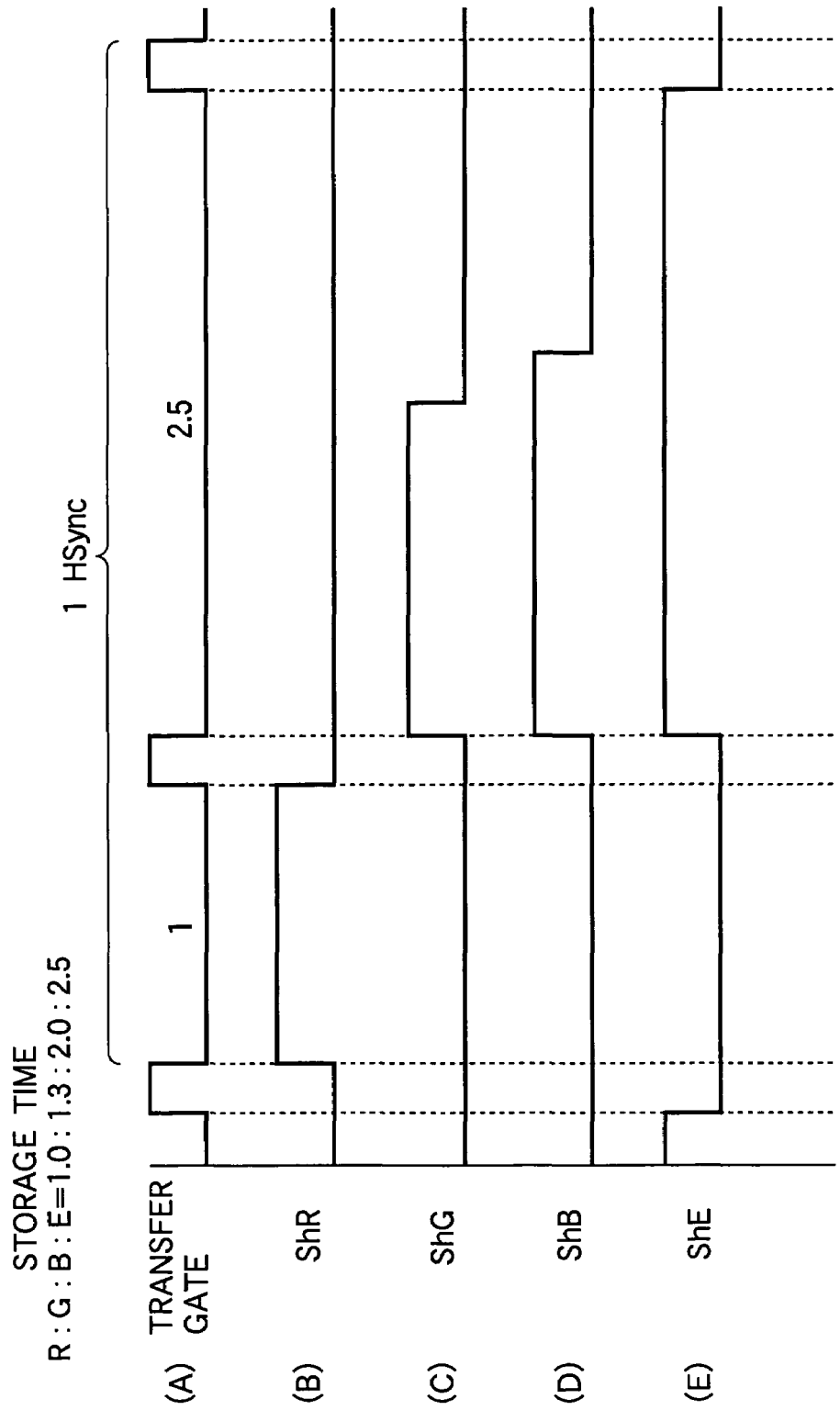
FIG. 10 is a timing chart showing the opening-closing timing of the electronic shutter gates of a photoelectric conversion element array of each channel when data of one channel and data of three channels are alternately the object of reading in a case where in the second embodiment, the predetermined storage time in a photoelectric conversion element array of four channels is set to R:G:B:E=1.0:1.3:2.0:2.5.

FIG. 10 is a timing chart showing the opening-closing timing of the electronic shutter gates of the photoelectric conversion element of each channel when one channel and three channels are to be alternately read in a case where in the second embodiment, the predetermined accumulation time in the photoelectric conversion elements of four channels is set to R:G:B:E=1.0:1.3:2.0:2.5.

When one channel and three channels are to be alternately read, in order to make the combination of the reading times shortest, design is made such that the aforementioned combination is based on the rule that "the channel for which the accumulation time is shortest" is not combined with the other channels, but "the channels for which the accumulation time is longest to third longest" are combined together. That is, as shown in FIG. 10, if in the first half, image reading is effected in the R channel ((B) in FIG. 10)(reading time 1.0), and in the second half, image reading is effected in the G, B and E channels ((C), (D) and (E) in FIG. 10)(reading time 2.5), the total reading time becomes 3.5. This becomes a combination of channels which makes the total reading time shortest when one channel and three channels are to be alternately read.

Comparing the case where only two channels are to be read each time and the case where one channel and three channels are to be alternately read with each other, the reading time in the latter case is shorter than that in the former case, while on the other hand, the maximum value of the processing object data amount in the former case is small as compared with that in the latter case, and this also leads to the advantage that for example, the processing time by the A/D conversion circuit in the former case can be made short as compared with the processing time by the A/D conversion circuit in the latter case.

Third Embodiment

A third embodiment of the present invention will now be described. In the above-described first and second embodiments, in which line the output signal of the photoelectric conversion device should be is simply selected and therefore, a simple circuit suffices for construction, but there is a signal discarded therein. In the present embodiment, a circuit construction in which a line memory and an addition circuit for adding the signals of adjacent lines for each pixel are added between the A/D conversion circuit 407 and the line offset section 303 in FIG. 3.

Figure 11:
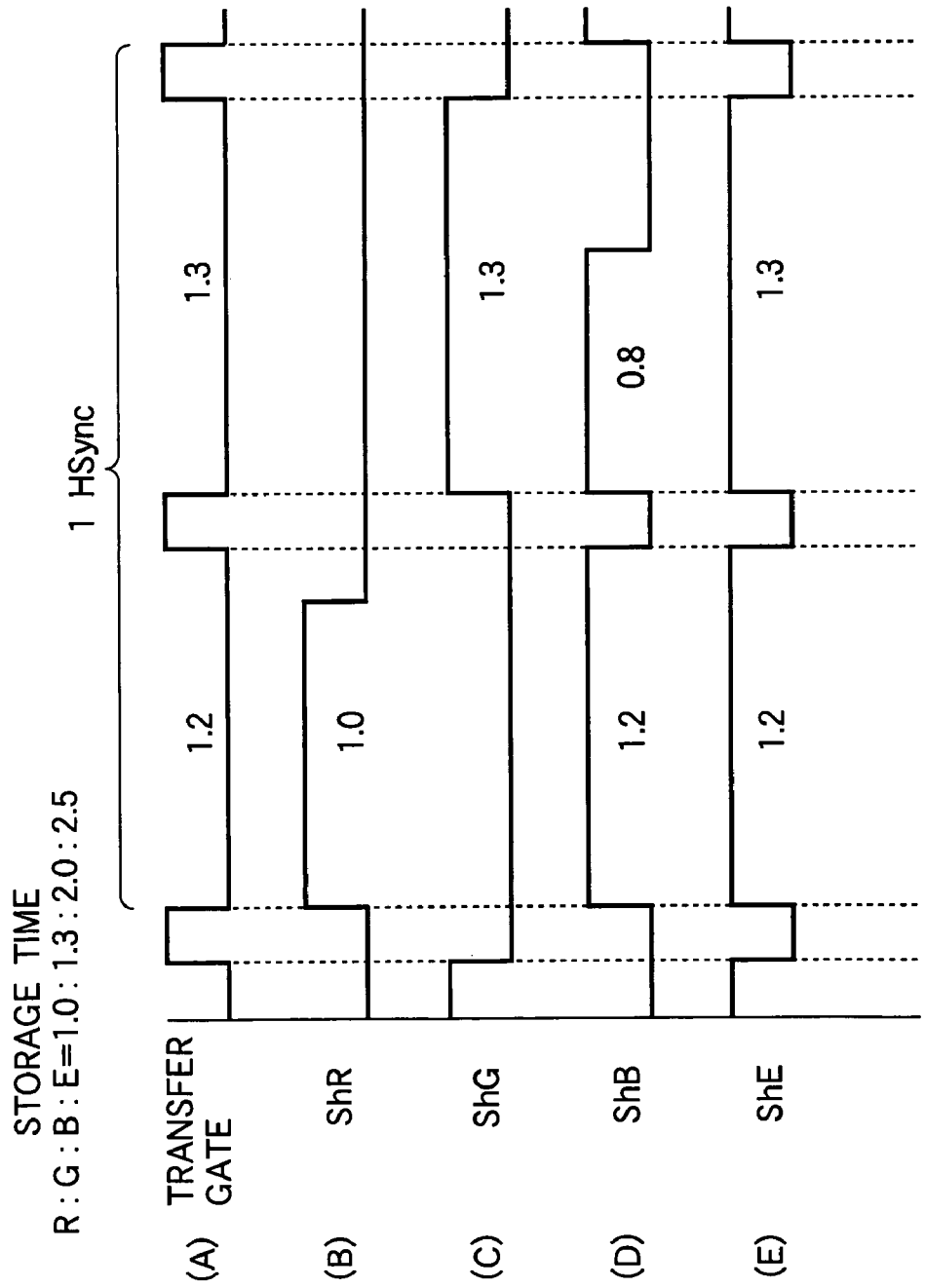
FIG. 11 is a timing chart showing the opening-closing timing of the electronic shutter gates of a photoelectric conversion element array of each channel when reading is effected with the set of selection of three channels alternately changed for a line in a case where in a third embodiment, a predetermined storage time in a photoelectric conversion element array of four channels is set to R:G:B:E=1.0:1.3:2.0:2.5.

FIG. 11 shows a timing chart in which in the third embodiment, the predetermined accumulation time in the photoelectric conversion elements of four channels is distributed to the reading of two lines at the same ratio as that in the second embodiment. The accumulation times of the E and B channels which are longest and second longest are distributed to the two lines in the first half and the second half. It is to be understood that the time between the transfer gate pulses of one line to which the accumulation time is distributed is the same as the accumulation time of the G channel which is third longest (here, a length of 1.3 in the second half). It is to be understood that the time between the transfer gate pulses of the other line in which the accumulation of the distribution is included (here, the first half) is the longer one of 1.0 of the R channel which is the remaining channel and the remaining time of the longest E channel (1.2=2.5−1.3). Here, the time between the transfer gate pulses of the line is 1.2 in the first half, and 1.3 in the second half. The second longest B channel is distributed in accordance with this. The electronic shutter gates are opened and closed so that the first half may be the times of R (1), B (1.2) and E (1.2), and the electronic shutter gates are opened and closed so that the second half may be the times of G (1.3), B (0.8) and E (1.3). In the first half, the signals of R, B and E are selected by the selection circuit and sent to the A/D conversion circuit 407. In the second half, the signals of G, B and E are selected by the selection circuit and sent to the A/D conversion circuit 407. The signals of the B and E channels divided into the first half and the second half are added together at the stage of the digital signal of the output of the A/D conversion circuit 407. For this, use is made of the line memory and the addition circuit (not shown) for adding the signals of adjacent lines for each pixel additionally provided between the A/D conversion circuit 407 and the line offset section 303 in FIG. 3 as previously described.

Other Embodiments

In the foregoing description, the A/D conversion circuit 407 has been described as the processing of the three-channel input. For this, use is made of a construction in which there are input terminals for three channels and in the interior of which, a single A/D converter is used in time division by an analog multiplexer. There is also conceivable a construction in which three A/D converters are used in parallel.

Also, while in the above-described embodiments, the basic colors are four colors, up to six colors can be coped with by two circuits of the three-channel input. Generally, when use is made of an A/D conversion circuit of N-channel input, up to M×N colors can be coped with if coped with by M circuits.

The object of the present invention can also be achieved by supplying a system or an apparatus with a storage medium having recorded therein the program code of software realizing the function of each of the aforedescribed embodiments, and the computer (or the CPU, MPU or the like) of the system or the apparatus reading out and executing the program code stored it the storage medium.

In this case, the program code itself read out of the storage medium realizes a novel function of the present invention, and the storage medium and program storing the program code therein constitute the present invention.

Also, as the storage medium for supplying the program code, use can be made, for example, of a flexible disk, a hard disk, an optical disk, a magneto-optical disk, a CD-ROM, a CD-R, a CD-RW, a DVD-ROM, a DVD-RAM, a DVD-R, a DVD-RW, a DVD+RW, a magnetic tape, a non-volatile memory card, a ROM or the like. Or the above-mentioned program is supplied by down-loading it from other computer, a data base or the like connected to the Internet, a commercially available network or a local area network.

Also, the present invention covers a case where not only the function of each of the aforedescribed embodiments is realized by the computer executing the read-out program code, but on the basis of the instructions of that program code, an operating system (OS) or the like working on the computer executes part or the whole of actual processing, and the function of each of the aforedescribed embodiments is realized by the processing.

The present invention further covers a case where after the program code read out of the storage medium has been written into a memory provided in a function expanding board inserted in the computer or a function expanding unit connected to the computer, a CPU or the like provided in the function expanding board or the function expanding unit executes part or the whole of actual processing on the basis of the instructions of the program code, and the function of each of the aforedescribed embodiments is realized by the processing.

This application claims priority from Japanese Patent Application No. 2004-221818 filed on Jul. 29, 2004, which is hereby incorporated by reference herein.

What is claimed is:

1. An image reading apparatus for effecting line reading in a main scanning direction by scanning in a sub-scanning direction to thereby read the image of an original, the apparatus including:
   a photoelectric conversion device for resolving an optical signal representative of an inputted line image into a number of basic colors exceeding a predetermined number and outputting them as analog electrical signals;
   an analog/digital conversion circuit for inputting said predetermined number of the analog electrical signals differing from one another at a time, and converting respective ones of the analog electrical signals into digital signals; and
   a selection circuit for selecting the analog electrical signals equal to or less than said predetermined number from the output of said photoelectric conversion device at each image reading of one main scanning line and also selecting the analog electrical signals of a different combination at the reading of the images of both adjacent main scanning lines, and outputting them to said analog/digital conversion circuit,
   wherein said photoelectric conversion circuit is configured to resolve the inputted optical signal into four basic colors and outputting them as analog electrical signals, and said analog/digital conversion circuit is configured to input up to three analog electrical signals at a time, and converting them into digital signals, and
   wherein said selection circuit selects first and second analog electrical signals from the output of said photoelectric conversion device at the reading of the image of a first main scanning line, and selects third and fourth analog electrical signals from the output of said photoelectric conversion device at the image reading of a second main scanning line adjacent to said first scanning line.

2. An image reading apparatus for effecting line reading in a main scanning direction by scanning in a sub-scanning direction to thereby read the image of an original, the apparatus including:
   a photoelectric conversion device for resolving an optical signal representative of an inputted line image into a number of basic colors exceeding a predetermined number and outputting them as analog electrical signals;
   an analog/digital conversion circuit for inputting said predetermined number of the analog electrical signals differing from one another at a time, and converting respective ones of the analog electrical signals into digital signals; and
   a selection circuit for selecting the analog electrical signals equal to or less than said predetermined number from the output of said photoelectric conversion device at each image reading of one main scanning line and also selecting the analog electrical signals of a different combination at the reading of the images of both adjacent main scanning lines, and outputting them to said analog/digital conversion circuit,
   wherein said photoelectric conversion circuit is configured to resolve the inputted optical signal into four basic colors and outputting them as analog electrical signals, and said analog/digital conversion circuit is configured to input up to three analog electrical signals at a time, and converting them into digital signals,
   wherein the light inputted to said photoelectric conversion device is transmitted light from an original film to which light has been applied, said photoelectric conversion device includes four single-color photoelectric conversion devices corresponding to said four basic colors, respectively, and said four single-color photoelectric conversion device accumulate therein charges corresponding to the inputted light for predetermined accumulation times differing from one another, and
   wherein said selection circuit selects the analog electrical signals outputted from two devices of said four single-color photoelectric conversion devices which are shortest and second shortest in said predetermined accumulation time, at the image reading of a first main scanning line, and selects the analog electrical signals outputted from the devices other than said selected two devices of said four single-color photoelectric conversion devices, at the image reading of a second main scanning line adjacent to said first main scanning line adjacent to said first main scanning line.

3. An image reading apparatus for effecting line reading in a main scanning direction by scanning in a sub-scanning direction to thereby read the image of an original, the apparatus including:
   a photoelectric conversion device for resolving an optical signal representative of an inputted line image into a number of basic colors exceeding a predetermined number and outputting them as analog electrical signals;
   an analog/digital conversion circuit for inputting said predetermined number of the analog electrical signals differing from one another at a time, and converting respective ones of the analog electrical signals into digital signals; and
   a selection circuit for selecting the analog electrical signals equal to or less than said predetermined number from the output of said photoelectric conversion device at each image reading of one main scanning line and also selecting the analog electrical signals of a different combination at the reading of the images of both adjacent main scanning lines, and outputting them to said analog/digital conversion circuit,
   wherein said photoelectric conversion circuit is configured to resolve the inputted optical signal into four basic colors and outputting them as analog electrical signals, and said analog/digital conversion circuit is configured to input up to three analog electrical signals at a time, and converting them into digital signals,
   wherein the light inputted to said photoelectric conversion device is transmitted light from an original film to which light has been applied, said photoelectric conversion device includes four single-color photoelectric conversion devices corresponding to said four basic colors, respectively, and said four single-color photoelectric conversion device accumulate therein charges corresponding to the inputted light for predetermined accumulation times differing from one another, and
   wherein said selection circuit selects the analog electrical signal outputted from one device of said four single-color photoelectric conversion devices which is shortest in said predetermined accumulation time, at the image reading of a first main scanning line, and selects the analog electrical signals outputted from the devices other than said selected one device of said four single-color photoelectric conversion devices, at the image reading of a second main scanning line adjacent to said first main scanning line.

4. An image reading apparatus for effecting line reading in a main scanning direction by scanning in a sub-scanning direction to thereby read the image of an original, the apparatus including:

a photoelectric conversion device for resolving an optical signal representative of an inputted line image into a number of basic colors exceeding a predetermined number and outputting them as analog electrical signals;

an analog/digital conversion circuit for inputting said predetermined number of the analog electrical signals differing from one another at a time, and converting respective ones of the analog electrical signals into digital signals; and a selection circuit for selecting the analog electrical signals equal to or less than said predetermined number from the output of said photoelectric conversion device at each image reading of one main scanning line and also selecting the analog electrical signals of a different combination at the reading of the images of both adjacent main scanning lines, and outputting them to said analog/digital conversion circuit, wherein said photoelectric conversion circuit is configured to resolve the inputted optical signal into four basic colors and outputting them as analog electrical signals, and said analog/digital conversion circuit is configured to input up to three analog electrical signals at a time, and converting them into digital signals, wherein the light inputted to said photoelectric conversion device is transmitted light from an original film to which light has been applied, said photoelectric conversion device includes four single-color photoelectric conversion devices corresponding to said four basic colors, respectively, and said four single-color photoelectric conversion device accumulate therein charges corresponding to the inputted light for predetermined accumulation times differing from one another, wherein said selection circuit selects the analog electrical signals outputted from three devices of said four single-color photoelectric conversion devices which are longest, second longest and third longest in said predetermined accumulation time, at the image reading of a first main scanning line, and selects the analog electrical signals outputted from the three devices of said four single-color photoelectric conversion devices which are longest, second longest and fourth longest in said predetermined accumulation time, at the image reading of a second main scanning line adjacent to said first main scanning line, and wherein said image reading apparatus further has an adding circuit, said adding circuit adds together the digital signals corresponding to the outputs of the single-color conversion devices which are longest and second longest in said predetermined accumulation time, obtained by the image reading of said first and second main scanning lines, for each pixel.

* * * * *